United States Patent [19]

Winsor

[11] 4,169,415
[45] Oct. 2, 1979

[54] CORRUGATED STEEL WALL LINING FOR BOXCAR

[75] Inventor: Robert B. Winsor, Beaconsfield, Canada

[73] Assignee: IEC-Holden Ltd., Montreal, Canada

[21] Appl. No.: 855,699

[22] Filed: Nov. 29, 1977

[51] Int. Cl.$^2$ ............................................. B60P 7/08
[52] U.S. Cl. .................................... 105/483; 52/630; 105/480; 296/39 R
[58] Field of Search ............... 105/475, 409, 478, 479, 105/480, 483; 280/179 R, 179 A; 296/39 R, 24 R, 34, 40, 42; 52/704, 706, 630, 125

[56] References Cited

U.S. PATENT DOCUMENTS

| 2,839,013 | 6/1958 | Gunnell et al. | 105/483 |
| 2,870,722 | 1/1959 | Oakley | 105/478 |
| 2,919,663 | 1/1960 | Neuhart | 105/483 |
| 3,083,394 | 6/1962 | Brinker et al. | 105/483 |

FOREIGN PATENT DOCUMENTS 621596  6/1961  Canada .................................... 105/479

Primary Examiner—Albert J. Makay
Assistant Examiner—Ross Weaver
Attorney, Agent, or Firm—Alan Swabey; Robert Mitchell; Melvin Sher

[57] ABSTRACT

A metal sheet for lining side walls of a freight railway car having a plurality of spaced-apart vertical wall supports. The metal sheet comprises a plurality of spaced-apart elongated channels formed across a flat surface of the sheet. Each of the channels has a bottom wall spaced from the flat surface of the sheet. A plurality of spaced-apart apertures are provided in the bottom wall of at least some of the channels to permit an attachment element to connect the sheet to an associated one of the vertical wall supports. The channels are configured to receive an anchor bar having an attachment part and securable ends. The securable ends are weldable in the channels in close proximity to an associated one of the apertures so that the anchor bar is rigidly connected, through its weld and the bottom wall, in close proximity to the support, whereby cargo retaining strapping, or the like, may be attached to the attachment part to secure cargo in the railway car.

7 Claims, 6 Drawing Figures

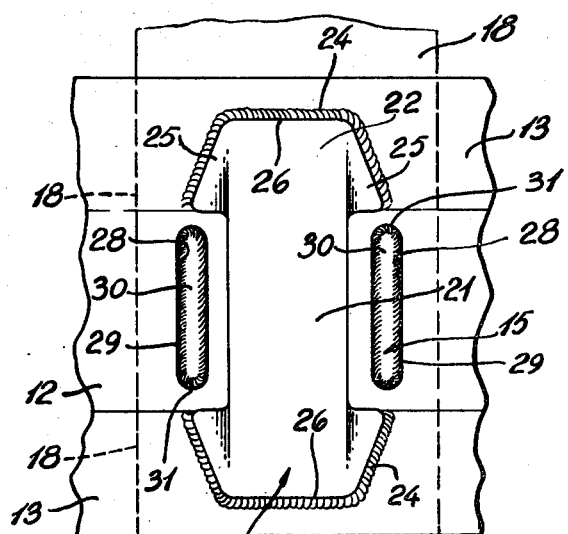
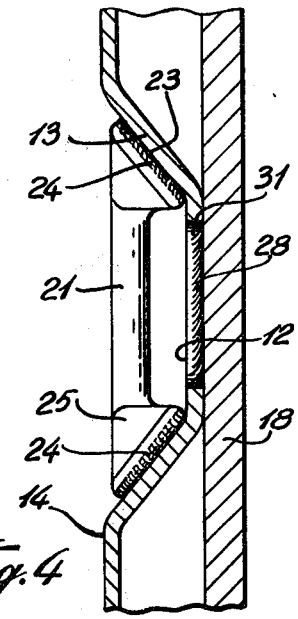
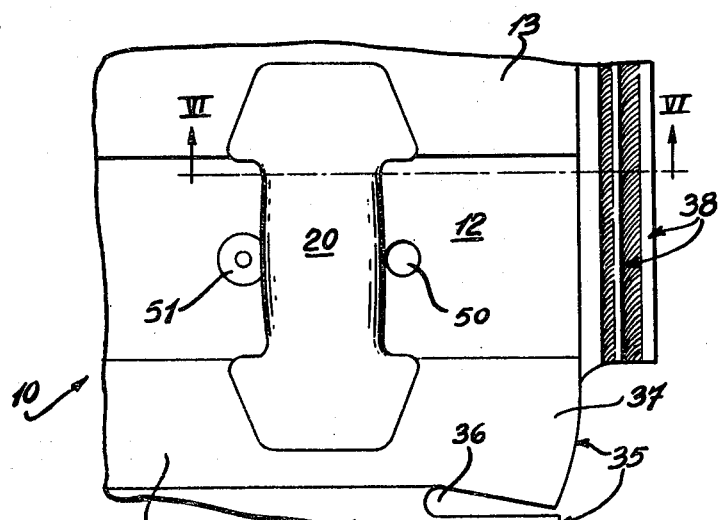
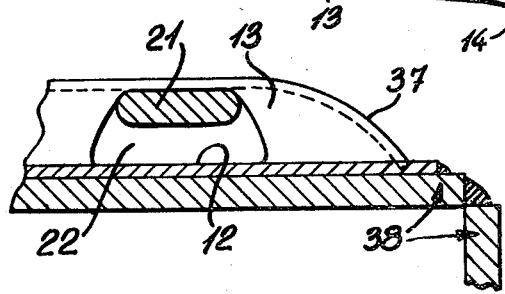

CORRUGATED STEEL WALL LINING FOR BOXCAR

BACKGROUND OF THE INVENTION (a) Field of the Invention

The present invention relates to a metal sheet construction for use in lining walls, and particularly, but not exclusively, walls of freight railway cars, where it is necessary to attach strapping, or the like, to the walls.

(b) Description of Prior Art

It is known to provide railway freight cars with anchoring devices secured to the side walls whereby to attach strapping in order to secure cargo rigidly within the railway car. However, in many instances, the anchoring devices are merely secured to the wall surface and not attached to the framework. Consequently, these anchoring elements are often torn out of the wall or deform themselves or the wall by excessive force applied to the strapping by shifting loads.

SUMMARY OF INVENTION

It is a feature of the present invention to provide a metal sheet for wall lining incorporating anchor bars therein which are rigidly securable in close proximity to wall supports.

A further feature of the present invention is to provide a corrugated metal sheet for wall lining wherein wall sections of the railway freight car or an entire wall can be fitted with a single sheet having provided therein a plurality of anchor bars and wherein the sheets are secured to wall supports by welds or other fastening means in the sheet and in close proximity to the anchor bars.

A further feature of the present invention is to provide an improved corrugated metal sheet for wall lining and wherein the sheet is secured to wall supports by means of welds or other fastening means formed along cavities positioned at predetermined intervals within the sheet, the corrugated sheet forming a plurality of spaced-apart channels adapted to receive therein one or more anchor bars.

According to the above features, from a broad aspect, the present invention provides a metal sheet for wall lining, which sheet comprises a plurality of cavities in a top surface thereof. Each of the cavities has a bottom wall spaced from the top surface. The bottom wall of at least some of the cavities constitutes an attachment means to connect the sheet to a wall support. The cavities are configured to receive an anchor bar having an attachment part and securement means. The securement means is weldable in the cavities in close proximity to the bottom wall whereby the anchor bar is rigidly connected through its weld and the bottom wall in close proximity to the wall support.

BRIEF DESCRIPTION OF THE DRAWINGS

A preferred embodiment of the present invention will now be described with reference to the accompanying drawings in which:

FIG. 3 is a plan view illustrating a portion of the metal sheet where the anchor bar is secured;

FIG. 4 is a side view of FIG. 3;

FIG. 5 is a plan view of an end section of the sheet of FIG. 1 showing a feature thereof; and FIG. 6 is a bottom end view along section lines VI—VI of FIG. 5.

DESCRIPTION OF PREFERRED EMBODIMENTS

Figure 1:
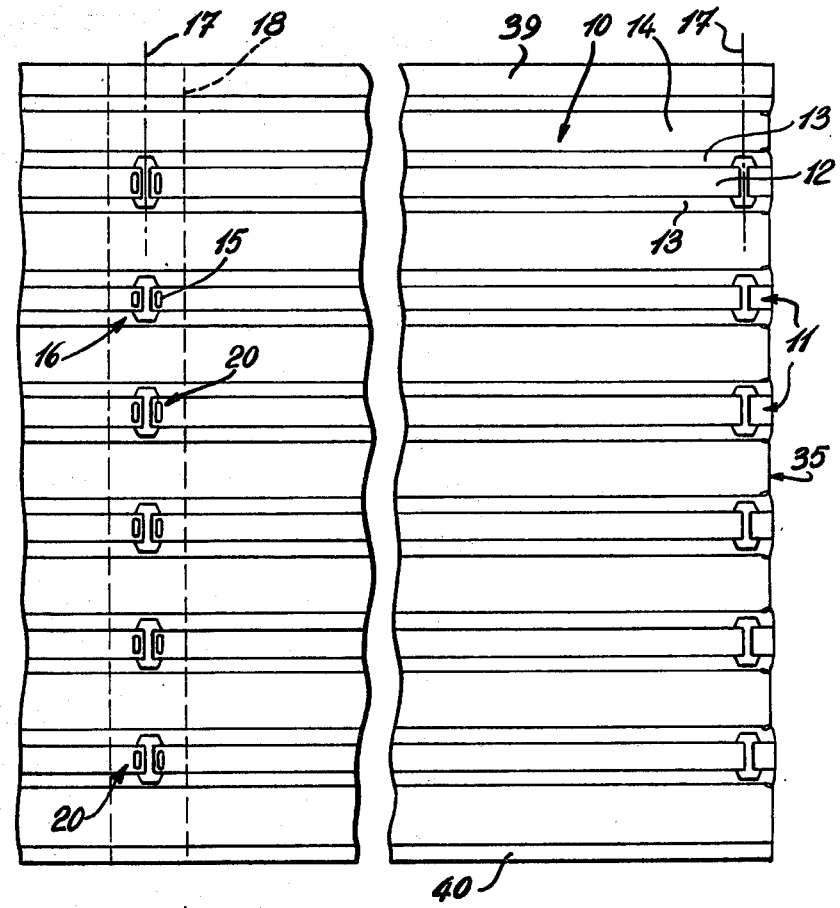
FIG. 1 is a fragmented plan view of the metal sheet of the present invention.
Figure 2:
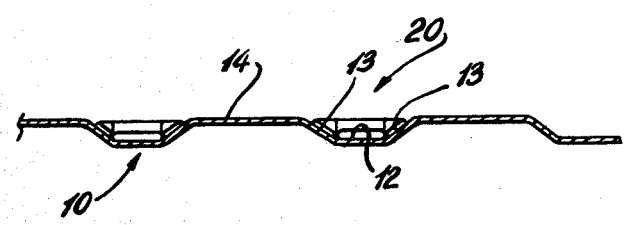
FIG. 2 is a sectional end view of a portion of the metal sheet of FIG. 1.

Referring now to the drawings, and more particularly to FIGS. 1 and 2, there is shown generally at 10, the metal sheet of the present invention for lining walls having spaced-apart vertical supports. The sheet comprises generally a plurality of cavities herein constituted by a plurality of spaced-apart elongated channels 11 formed across the sheet with each channel 11 extending parallel to one another. Each channel has a flat bottom wall 12 and outwardly tapering side walls 13 extending from the bottom wall 12 to the flat top surface 14 of the sheet 10.

A plurality of apertures 15 extend at spaced-apart intervals along each of the channels 11 and extend transverse to the longitudinal axis of the channels 11. As hereinshown, the channels 15 are provided in pairs 16, each pair 16 consisting of two closely spaced elongated slot apertures 15. Each pair 16 of slot apertures 15 of each channel 11 are in transverse alignment with one another. The spacing between the long axis 17 of the aligned pairs of apertures is predetermined whereby these pairs of apertures are in alignment with wall supports 18 to which the sheet 10 is to be secured.

Referring now additionally to FIGS. 3 and 4, there is shown a plurality of anchor bars 20 secured within the channels 11 and in alignment with the pairs 16 of apertures 15. Although FIG. 1 shows anchor bars 20 associated with each pair of apertures, it is clearly understood that these could be secured with random pairs 16 of apertures or with the pairs of apertures in every second one of the channels 11.

The anchor bars 20 are each provided with an attachment part, hereinshown as a bridge section 21 having securement means or end supports 22 which are weldable to a respective one of the tapering side walls 13 of the channels 11. As seen more clearly in FIG. 4, the bridge section 21 is spaced forwardly of the bottom wall 12 and the end supports 22 are provided with angulated bearing surfaces 23 which lie flat on the angulated side walls 13 of the channels. The end supports 22 are secured within the channels 20 by means of securement welds 24 which may be provided on opposed sides 25 of each end support 22 and additionally about its outer end 26. Thus, the anchor bar 20 is rigidly secured across the channel 11.

In order to secure the sheet 10 to the wall supports 18, the sheet is fitted whereby the pairs 16 of apertures 15 are aligned with a respective one of the supports 18. This is more clearly shown in FIG. 3 and it can be seen that the sheet 10 is attached to the support 18 by attachment welds 28 interconnecting a marginal portion 29 of the flat bottom wall 12 near each slot aperture 15 to a metallic portion 30 of the support 18. Of course, a plug weld could interconnect all of the circumference of the slot aperture 15. As can be seen, the apertures 15 extend along a substantial transverse portion of the flat bottom wall 12 whereby the opposed ends 31 of each aperture 15 are in close proximity to the securement weld 24 of the end supports 22. Thus, the anchor bar 20 is rigidly connected through the welds 24 and 28 and, of course, the channels of the sheet 10, in close proximity to the wall support 18. This provides for a rigid anchoring of the anchor bar 20 as any force exerted thereon is also exerted on the wall support 18.

As shown in the preferred embodiment of the present invention described herein, each pair 16 of apertures 15 are spaced-apart whereby each aperture 15 lies on a respective side of the bridge section 21 of the anchor bar 20. This facilitates the formation of the weld 28. Further, the anchor bar 20 could be welded in the channel 11 after the sheet 10 is welded to the wall supports 18. If the wall supports 18 are constructed of material not capable of receiving the weld 28, then a metal bracket (not shown) could be secured to the wall support to receive the weld.

It is also foreseen that the cavities, herein channels 11 of sheet 10, may be constituted by rectangularly shaped cavities extending in transverse alignment in the top surface 14 of the sheet and being of the same cross-section as the channels 11 whereby to receive the anchor bars 20 in the same manner as described hereinabove. Also, a single aperture 15 may be provided and of different configuration than that herein described. For example, the aperture could also be rectangular and extending entirely across the width of the bridge section 21 whereby a weld could be made on each side of the cavity and in close proximity to the securement weld 24 on each side of the end supports 22 of the anchor bar 20. Still further, the anchor bar 20 may be of different configuration and instead of a bridge section, there could be provided an attachment ring adapted for attachment of strapping ropes, or the like thereto. The shape of the bottom wall and side walls of the cavity could also vary from the one disclosed herein provided that the anchor bar is attached to the sheet and the sheet attached to the post in such a manner as to provide attachment of the anchor bar in close proximity to the wall supports 18.

The above description discloses a particular attachment means to connect the sheet 10 to the wall supports 18. However, in the construction of new walls where an outside sheet is not already secured to the supports 18, the sheet 10 may be welded to the supports in its back side where the channel bottom wall 12 abuts the supports 18. Thus, the slot apertures 15 would not be required. Also, instead of slot apertures 15 there may be provided circular holes such as shown at 50 in FIG. 5 to receive therein a fastener such as a screw or rivet, as shown at 51. If the supports 18 are wood pieces, the fasteners could be nails or screws. In all instances, the fasteners are positioned in the channels 11 to be recessed from the top surface 14 not to interfere with commodity placed against the sheet 10.

Referring now to FIGS. 5 and 6, there is shown the construction of the end edge 35 of the sheet 10. As can be shown, a slot 36 extends from the end edge 35 of the sheet in the flat surface 14 thereof immediately adjacent the tapering side wall 13 of the channel 11. This will permit the end portions 37 of the sheet to be bent inwardly, as shown in FIG. 6, to have a smooth edge weldable to a corner post structure such as 38.

As shown in FIG. 1, the top and bottom edges 39 and 40 of the sheet 10 are severed at predetermined locations i.e. at the junction of a side wall 13 and bottom wall 12 of a channel 11, whereby the sheets can be stacked one on top of the other with the joint between sheets substantially concealed and repeating the corrugated pattern. Also, this type of edge permits the sheet 10 to be neatly fitted in the bottom portion of a wall wherein the top part is constructed of wood panelling. Thus, the top edge portion 39 could be secured under the bottom edge rear wall of the bottom plank (not shown). This type of sheet can also find utility in refitting existing railway cars with a new inner wall lining, as such railway cars are already provided with spaced vertical wall supports. The sheet 10 is roll formed and can be of any desired length. Also, the sheet is very rigid as it is provided with corrugations and the channels between corrugations are further provided with the anchor bars 20 which adds to the rigidity of the entire sheet as these bars 20 fill the cavities in bridged areas. A further advantage of this sheet structure is that it is easy and quickly assembled and is hard-wearing. Further, the cavities in the sheet 10 do not need to be channels 11 and could be spaced-apart depressions with substantially vertical side walls extending at right angles to the top surface 14. Similarly, the channels 11 may have vertical side walls 13 rather than angularly sloping ones. An advantage of the angular side walls 13 is that they are easier to clean. It is also foreseen that the sheets 10 may be secured with the channels 11 extending vertically and the wall supports 18 extending horizontally.

It is within the ambit of the present invention to provide any other obvious modifications of the metal sheet, provided such modifications fall within the ambit of the broad claim as appended hereto.

I claim:

1. A corrugated metal sheet for lining at least opposed side walls of a freight compartment having a plurality of spaced-apart vertical wall supports, said metal sheet comprising a plurality of spaced-apart elongated channels formed across a smooth top surface of said sheet, said channels extending horizontally and transverse to said vertical wall supports, each of said channels having a flat bottom wall spaced from said surface and opposed connecting walls extending from said bottom wall to said top surface, a plurality of spaced-apart apertures in said bottom wall of at least some of said channels to permit an attachment means to connect said sheet to a plurality of said vertical wall supports, said channels being configured to receive individual anchor bars for securement therein, each anchor bar having an attachment part and opposed weldable end supports securable to a respective opposed connecting wall of said channel, said weldable end supports being welded in said channels in close non-interferring proximity to an associated one of said apertures so that said anchor bar is rigidly connected through its weld and said bottom wall in close proximity to said support whereby cargo retaining means may be attached to said attachment part to secure cargo in said freight compartment, said anchor bar also filling said associated channel in a bridge area to add rigidity to said corrugated metal sheet.

2. A metal sheet as claimed in claim 1 wherein said anchor bar attachment part is a bridge section extending between said opposed weldable end supports.

3. A metal sheet as claimed in claim 2 wherein said fastening means is an attachment weld extending transverse to the longitudinal axis of said channels along said aperture.

4. A metal sheet as claimed in claim 3 wherein said aperture is dimensioned to permit two of said attachment welds to be made and spaced from one another on a respective side of said bridge section, each said attachment welds interconnecting a marginal portion of said flat bottom wall near said aperture to a metallic portion of a respective one of said vertical wall supports, said weldable end supports each being welded to a respective one of said side walls.

5. A metal sheet as claimed in claim 2 wherein said aperture is a narrow slot aperture extending transverse to the longitudinal axis of said channels, there being a pair of closely spaced slot apertures positioned at predetermined intervals along at least some of said channels, each slot aperture of each pair of slot apertures being spaced-apart whereby they lie on a respective side of said bridge section of said anchor bar.

6. A metal sheet as claimed in claim 5 wherein said opposed connecting walls are angularly disposed, each said slot aperture extending along a substantial transverse portion of said flat bottom wall whereby their opposed ends are in close non-interferring proximity to said weldable end supports of said anchor bar which are welded to a respective one of said angular side walls, each attachment weld interconnecting a marginal portion of said flat bottom wall near each slot aperture of said pair of slot apertures to a metallic portion of a respective one of said vertical wall supports.

7. A metal sheet as claimed in claim 2 wherein said aperture is a through bore to receive a fastener therethrough to secure said bottom wall to a wall support, said fastener being recessed from said top surface in a respective one of said channels.

* * * * *